March 14, 1967  E. BYCZKOWSKI ET AL  3,309,138

RECLINING SEAT CONSTRUCTION

Filed Oct. 19, 1965  2 Sheets-Sheet 1

INVENTORS
ERNEST BYCZKOWSKI
HENRY J. TISCHLER
BY
Barnes, Kisselle, Raisch & Choate
ATTORNEYS

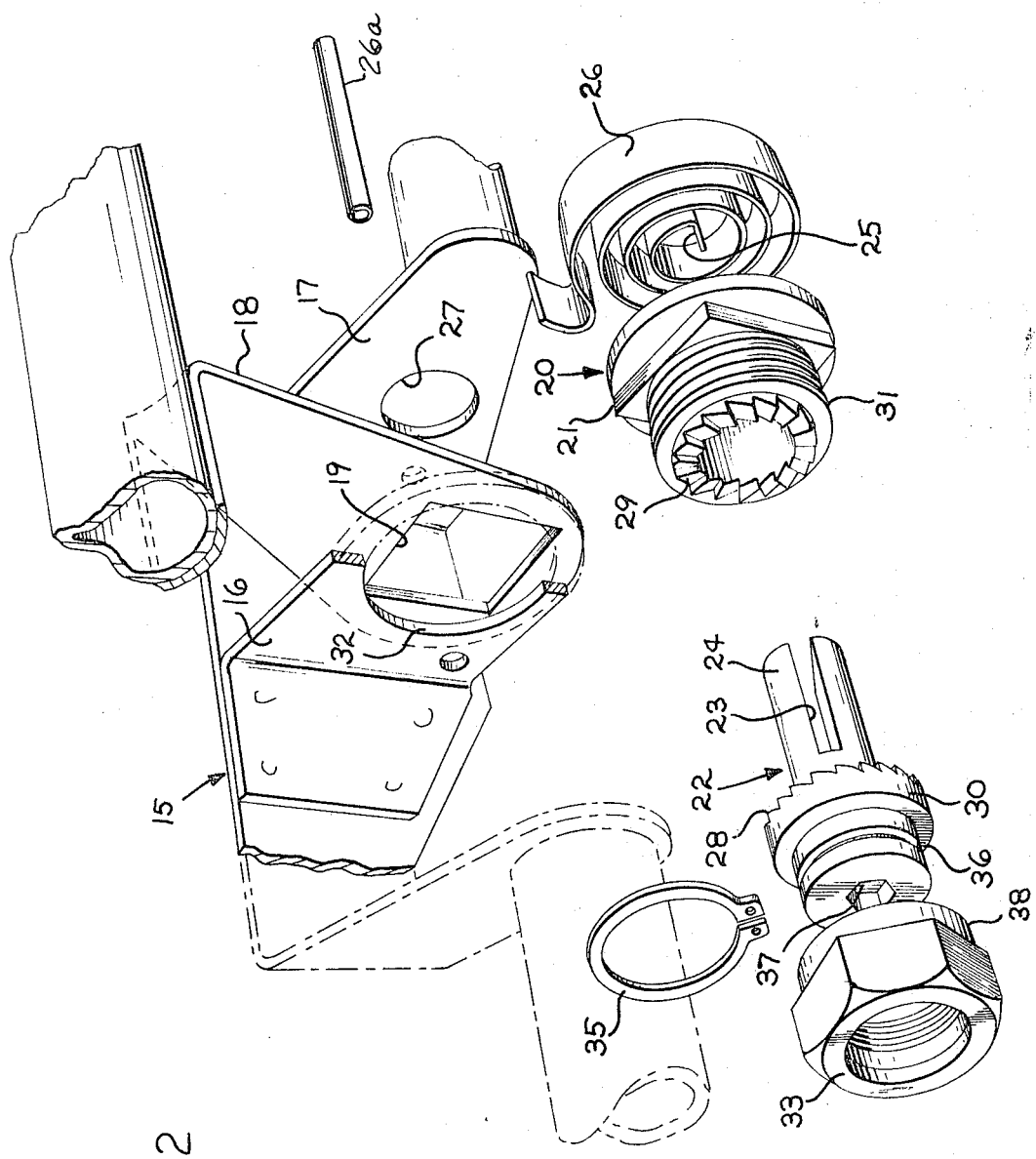

United States Patent Office 3,309,138
Patented Mar. 14, 1967

3,309,138
RECLINING SEAT CONSTRUCTION
Ernest Byczkowski, Detroit, and Henry J. Tischler, Bloomfield Hills, Mich., assignors to Young Spring & Wire Corporation, Detroit, Mich., a corporation of Michigan
Filed Oct. 19, 1965, Ser. No. 498,029
7 Claims. (Cl. 297—355)

This invention relates to reclining seats.

In reclining seats, it is conventional to utilize a return spring that returns the seat back to its upright position after the latch or similar seat adjuster is released. In such seats, it is desirable to be able to adjust the spring tension during the life of the seat since it may change. One of the problems with such conventional construction is that in order to reach the spring and vary the spring tension, it is necessary to remove substantial portions of the upholstery.

It is therefore an object of this invention to provide a reclining seat construction wherein the spring tension can be varied readily with a minimum removal or disarrangement of the upholstery.

It is a further object of the invention to provide a construction that is relatively simple and low in cost.

In the drawings:

FIG. 2 is a fragmentary part sectional exploded view of the improved portion of the reclining seat.

Figure 1:
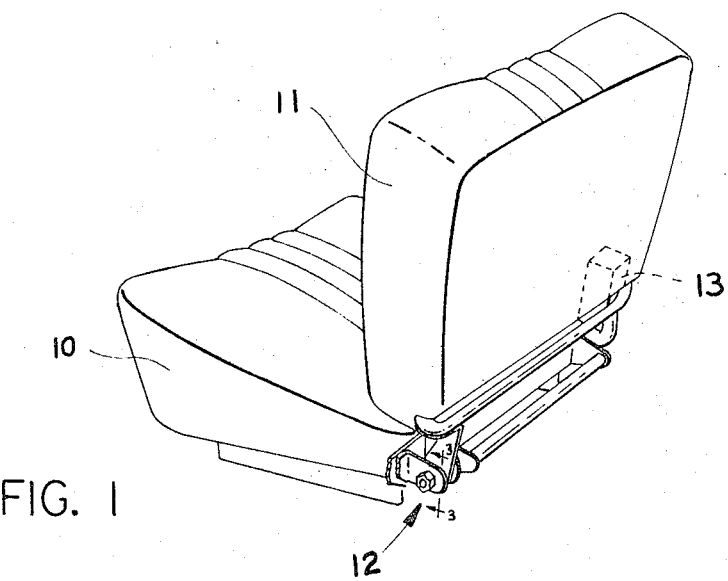
FIG. 1 is a fragmentary perspective view of a seat embodying the invention.

Referring to FIG. 1, conventional reclining seat comprises a base 10 and a seat back 11 which have a return spring pivot construction 12 at one end and a latch construction 13 at the other end. By releasing the holding mechanism of the latch structure 13, the seat back can be reclined to one or more rearwardly included positions as is well known in the art. When the holding mechanism of the latch construction 13 is released, the spring construction 12 tends to return the seat to its upright position.

Figure 3:
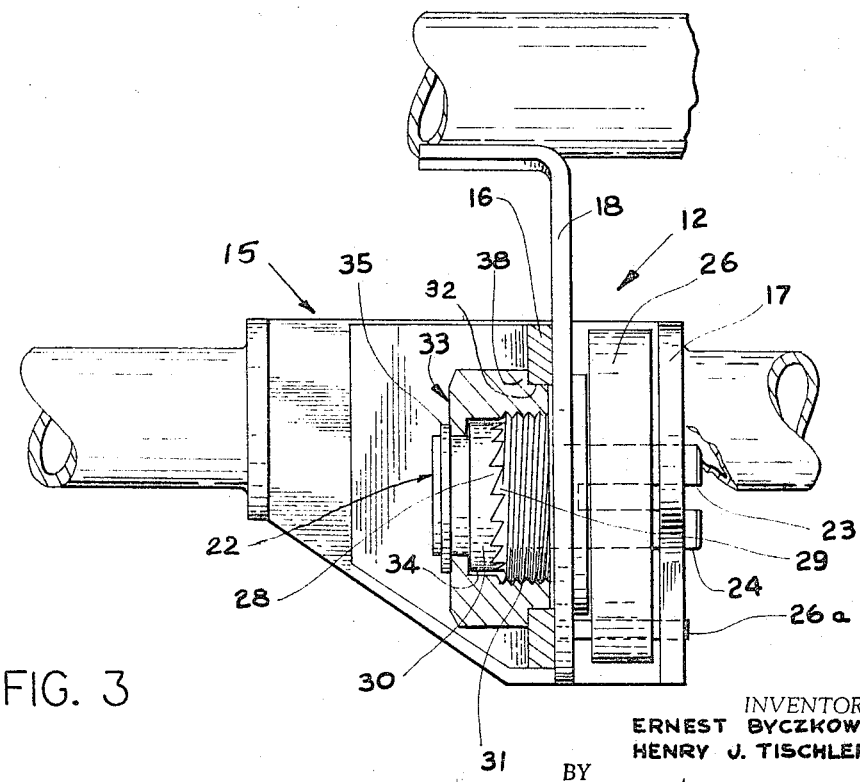
FIG. 3 is a fragmentary sectional view through the reclining seat taken along the line 3—3 in FIG. 1.

In accordance with the invention as shown in FIG. 3, the return spring construction 12 includes a first bracket 15 which is fixed to the base 10 and comprises a pair of spaced generally vertical walls 16, 17. A second bracket 18 which comprises a generally vertical wall extends downwardly from the seat back 11. Bracket 18 includes a non-circular opening 19, herein shown as square. A bushing 20 having a complementary non-circular portion 21 extends through opening 19 and is thereby non-rotatably fixed to the bracket 18. A pivot pin 22 extends through the bushing 20. Pivot pin 22 includes a slot 23 in one end thereof into which the inner end 25 of torsion spring 26 is threaded. The other end of the spring 26 engages a pin 26a extending between walls 16, 17. The end 24 of pivot pin 22 extends through a circular opening 27 in the wall 17 of the base bracket 15 and serves as a journal point.

Interengaging clutch teeth 28, 29 are provided on a shoulder 30 of the pin 22 and the end of the bushing 20, respectively. The teeth are unsymmetrical and are axially engageable. As shown in FIGS. 2 and 3, the bushing 20 includes a threaded portion 31 that extends through an opening 32 in the wall 16 of bracket 15. A lock nut 33 is threaded onto the bushing 20 and has a flange 34 that engages the flange 30 of the pin 22 to urge the teeth 28, 29 into engagement. Finally, a lock ring 35 is snapped into a groove 36 in the other end of the pin 22 to lock the lock nut 33 against axially outward movement. In this manner, the tension on the spring 26 is fixed.

In the event that it is necessary to adjust the spring tension, the lock ring 35 is removed and the lock nut 33 is partially threaded off the bushing 20 sufficiently to permit the pin 22 to be rotated. An Allen head wrench is inserted into an opening 37 in the end of the pin and the pin is rotated clockwise as viewed from the left in FIGS. 2 and 3, causing the teeth to successively override the teeth 29 and in turn rotating the end 25 of the spring 26 to increase the spring tension. As the pin 22 is rotated, the teeth 28 successively override and engage the teeth 29. When the proper tension has been achieved, the lock nut 33 is again threaded onto the bushing 20 and the lock ring 35 is applied.

It may be noted that the lock nut 33 includes a shoulder 38 that is complementary to and engages the sides of the opening 32 which serves as a second journal point in addition to the journal provided by the pin 24 engaging the opening 27.

We claim:

1. In a reclining seat comprising a base and seat back, the combination comprising
    a first bracket fixed to said base,
    a second bracket fixed to said seat back,
    a bushing,
    means for mounting said bushing on said seat back,
    a pivot pin extending through said bushing,
    a torsion spring having one end thereof connected to said base and the other end thereof connected to said pin,
    axially engageable means between said pin and said bushing whereby when said axially engageable means are engaged, said pin and said bushing are fixed with relation to said seat back,
    and a nut threaded on said bushing and adapted to urge said interengaging means into engagement when said nut is threaded on said bushing.

2. The combination set forth in claim 1 wherein said means for mounting said bushing on said seat back comprises a non-circular opening in said seat back bracket and a complementary projection on said bushing engaging said non-circular opening.

3. The combination set forth in claim 1 including means for locking said nut against axial movement outwardly relative to said pin and said bushing.

4. In a reclining seat comprising a seat base and a seat back, the combination comprising
    a first bracket adapted to be fixed to said base and having a pair of spaced wall members,
    a second bracket adapted to be fixed to said seat back and projecting between said wall members,
    said second bracket having a non-circular opening therein,
    a bushing having a non-circular cross sectional portion extending into said non-circular opening in said second bracket and thereby being fixedly mounted on said second bracket,
    a pivot pin extending through said bushing,
    one end of said pivot pin being slotted,
    a torsion spring having one end thereof extending into the slotted end of said pivot pin,
    means extending between said wall members fixing the other end of said torsion spring,
    one of said wall members of said first-mentioned bracket having an opening therein in which said pivot pin extends to form a journal,
    the other said wall member of said first-mentioned bracket having an opening therein through which said pivot pin and said bushing extend,
    said pivot pin and said bushing having a plurality of circumferentially spaced interengaging unsymmetrical clutch teeth thereon,
    and a nut,
    said nut and said bushing having interengaging threads whereby when said nut is threaded onto said bushing, it urges the clutch teeth into engagement, said nut having a portion with a circular cross section corresponding to the diameter of the opening in the other wall member of said first-mentioned bracket to form a second journal.

5. In a reclining seat comprising a base and seat back, the combination comprising a first bracket fixed to said base,
a second bracket fixed to said seat back,
a bushing,
means for mounting said bushing on said seat back comprising a non-circular opening in said seat back bracket and a complementary projection on said bushing engaging said non-circular opening,
a pivot pin extending through said bushing,
a torsion spring having one end thereof connected to said base and the other end thereof connected to said pin,
axially engageable means between said pin and said bushing whereby when said axially engageable means are engaged, said pin and said bushing are fixed with relation to said seat back,
a nut threaded on said bushing and adapted to urge said interengaging means into engagement when said nut is threaded on said bushing,
means for locking said nut against axial movement outwardly relative to said pin and said bushing.

6. In a reclining seat comprising a seat base and a seat back, the combinaton comprising a first bracket adapted to be fixed to said base and having a pair of spaced wall members,
said second bracket having a non-circular opening therein,
a bushing having a non-circular cross sectional portion extending into said non-circular opening in said second bracket and thereby being fixedly mounted on said second bracket,
a pivot pin extending through said bushing,
one end of said pivot pin being slotted,
a torsion spring having one end thereof extending into the slotted end of said pivot pin,
means extending between said wall members fixing the other end of said torsion spring,
one of said wall members of said first-mentioned bracket having an opening therein in which said pivot pin extends,
the other said wall member of said first-mentioned bracket having an opening therein through which said pivot pin and said bushing extend,
said pivot pin and said bushing having a plurality of circumferentially spaced interengaging clutch teeth thereon,
a nut,
said nut and said bushing having interengaging threads whereby when said jam nut is threaded onto said bushing, it urges the clutch teeth into engagement,
said nut having a portion with a circular across section corresponding to the diameter of the opening in the other wall member of said first-mentioned bracket,
means for locking said nut against axial movement outwardly relative to said pin and said bushing.

7. In a reclining seat comprising a base and seat back, the combination comprising a first bracket fixed to said base,
a second bracket fixed to said seat back,
a bushing,
means for mounting said bushing on said seat back,
a pivot pin extending through said bushing,
a torsion spring having one end thereof connected to said base and the other end thereof connected to said pin,
axially engageable means between said pin and said bushing whereby when said axially engageable means are engaged, said pin and said bushing are fixed with relation to said seat back,
and means on said bushing adapted to urge said interengaging means into engagement when said nut is threaded on said bushing.

References Cited by the Examiner
UNITED STATES PATENTS

| | | | |
|---|---|---|---|
| 1,889,478 | 11/1932 | Hultgren | 297—369 |
| 2,712,345 | 7/1955 | Borisch | 297—369 |
| 2,809,691 | 10/1957 | Norwood et al. | 297—369 |
| 2,941,583 | 6/1960 | Tischler et al. | 297—369 |
| 2,997,341 | 8/1961 | Borgia | 297—369 |

FRANK B. SHERRY, *Primary Examiner.*

G. O. FINCH, *Assistant Examiner.*